US008125490B1

(12) United States Patent
Vaidya et al.

(10) Patent No.: US 8,125,490 B1
(45) Date of Patent: Feb. 28, 2012

(54) SYSTEMS AND METHODS FOR REDUCING DISPLAY UNDER-RUN AND CONSERVING POWER

(75) Inventors: Priya Vaidya, Shrewsbury, MA (US); Kalpana Mittal, Sturbridge, MA (US)

(73) Assignee: Marvell International Ltd. (BM)

( * ) Notice: Subject to any disclaimer, the term of this patent is extended or adjusted under 35 U.S.C. 154(b) by 831 days.

(21) Appl. No.: 12/170,330

(22) Filed: Jul. 9, 2008

Related U.S. Application Data

(60) Provisional application No. 60/949,356, filed on Jul. 12, 2007, provisional application No. 61/030,422, filed on Feb. 21, 2008.

(51) Int. Cl.
*G06F 13/14* (2006.01)
*G06T 1/00* (2006.01)
*G06T 15/00* (2011.01)

(52) U.S. Cl. ......................... 345/520; 345/503; 345/522

(58) Field of Classification Search .................. 345/503, 345/520, 522, 542, 553, 557, 559
See application file for complete search history.

(56) References Cited

U.S. PATENT DOCUMENTS 6,717,583 B2 * 4/2004 Shimomura et al. .......... 345/542

* cited by examiner

*Primary Examiner* — Hau Nguyen

(57) ABSTRACT

A display system is disclosed. The display system has a processor, a memory, a display device, a display controller configured to control the display device, and a bus connecting the processor, the memory, and the display controller. The display system also has a performance monitoring module configured to monitor events that occur on the bus during operation of the display system, and a performance profiling module configured to calculate, based on the monitored events, an available throughput of the processor on the bus. The display system also has a policy manager module configured to determine a refresh rate for the display controller such that a throughput on the bus required by the display controller is less than the calculated available throughput.

21 Claims, 3 Drawing Sheets

SYSTEMS AND METHODS FOR REDUCING DISPLAY UNDER-RUN AND CONSERVING POWER

RELATED APPLICATIONS

This application claims the benefit of priority to U.S. Provisional Application No. 60/949,356 filed Jul. 12, 2007, entitled "Method and Apparatus for Performance Validation of LCD Sub-System to Eliminate LCD Under-Runs," which is herein incorporated by reference in its entirety. This application also claims the benefit of priority to U.S. Provisional Application No. 61/030,422 filed Feb. 21, 2008, entitled "Method and Apparatus for Dynamic Configuration of LCD Sub-System to Eliminate LCD Under-Runs and Save Power," which is herein incorporated by reference in its entirety.

TECHNICAL FIELD

The present disclosure relates generally to the field of display devices and, more particularly, to methods and systems for reducing display under-run and conserving power.

BACKGROUND

Reducing power consumption in mobile electronic devices, such as, for example, cell phones, personal digital assistants (PDAs), media players, and/or other handheld or mobile devices, has been a long-standing design consideration in the mobile electronics industry. It is important to consumers that these battery-powered devices can be used for long durations between recharge cycles. At the same time, however, consumers require that these devices provide a broad range of applications, such as Internet capability, audio-video playback, camera capability, GPS capability, etc.

Thus, it is important that these devices be optimized for both power consumption and performance. For example, the devices may be equipped with software having power-saving modes and/or with power-efficient microprocessors and other system components. In addition, the microprocessors may be run at the minimum clock speeds required to support the computing demands of the systems. As a result, throughput or bandwidth on the system buses may be scarce, and the systems may be designed such that devices on the buses are allocated only a certain portion of the available throughput.

In the case of the displays, such as liquid crystal displays (LCDs) and the like, the allocated throughput may be insufficient under some circumstances. For example, a display is typically assigned a refresh rate of about 50 Hz; that is, a new image or frame is displayed 50 times each second. An associated display controller on the system bus must fetch from memory enough data to satisfy the refresh rate. The display controller, however, typically has a lower priority on the bus than the microprocessor. Thus, in situations where the throughput of the system bus is insufficient to meet the demands of both the microprocessor and the display controller, the microprocessor is given priority.

Such situations can lead display "under-run," or "starving." In particular, if the display controller is unable to fetch from memory enough data to sustain the refresh rate (e.g., 50 Hz), blank and/or corrupt frames may be displayed between valid frames, which can be detected by the human eye. This phenomenon, known as "flicker," is unattractive to consumers in the mobile and/or handheld electronics market who demand superior display performance.

SUMMARY

One aspect of the disclosure is directed to a method for reducing display under-run. The method may include operating a display system comprising a processor, a memory, and a display controller on a bus; monitoring, during the operating, events that occur on the bus; and calculating, based on the monitored events, an available throughput of the processor on the bus. The method may further include determining a refresh rate of the display controller such that a throughput on the bus required by the display controller is less than the calculated available throughput.

Another aspect of the disclosure is directed to a display system. The display system may include a processor, a memory, a display device, a display controller configured to control the display device, and a bus connecting the processor, the memory, and the display controller. The display system may further include a performance monitoring module configured to monitor events that occur on the bus during operation of the display system; and a performance profiling module configured to calculate, based on the monitored events, an available throughput of the processor on the bus. The display system may also include a policy manager module configured to determine a refresh rate for the display controller such that a throughput on the bus required by the display controller is less than the calculated available throughput.

Yet another aspect of the disclosure is directed to a system for reducing display under-run in a display device comprising a processor, a memory, and a display controller on a bus. The system may include a performance monitoring module configured to monitor events that occur on the bus during operation of the display system; and a performance profiling module configured to calculate, based on the monitored events, an available throughput of the processor on the bus. The system may further include a policy manager module configured to determine a refresh rate for the display controller such that a throughput on the bus required by the display controller is less than the calculated available throughput.

Yet another aspect of the disclosure is directed to a computer-readable storage medium storing computer-executable instructions which, when executed by a display system comprising a processor, a memory, and a display controller on a bus, cause the display system to execute a method for reducing display under-run. The method may include monitoring, during operation of the display system, events that occur on the bus; and calculating, based on the monitored events, an available throughput of the processor on the bus. The method may further include determining a refresh rate for the display controller such that a throughput on the bus required by the display controller is less than the calculated available throughput.

Still yet another aspect of the disclosure is directed to a method for designing a display system. The method may include simulating operation of the display system, the display system comprising a processor, a memory, and a display controller on a bus. The method may further include monitoring events that occur on the bus during the simulated operation and calculating, based on the monitored events, an available throughput of the processor on the bus. The method may also include determining a refresh rate for the display controller such that a throughput on the bus required by the display controller is less than the calculated available throughput.

DETAILED DESCRIPTION

Reference will now be made in detail to embodiments of the disclosure, an example of which is illustrated in the accompanying drawings. Wherever possible, the same reference numbers will be used throughout the drawings to refer to the same or like parts.

Figure 1:
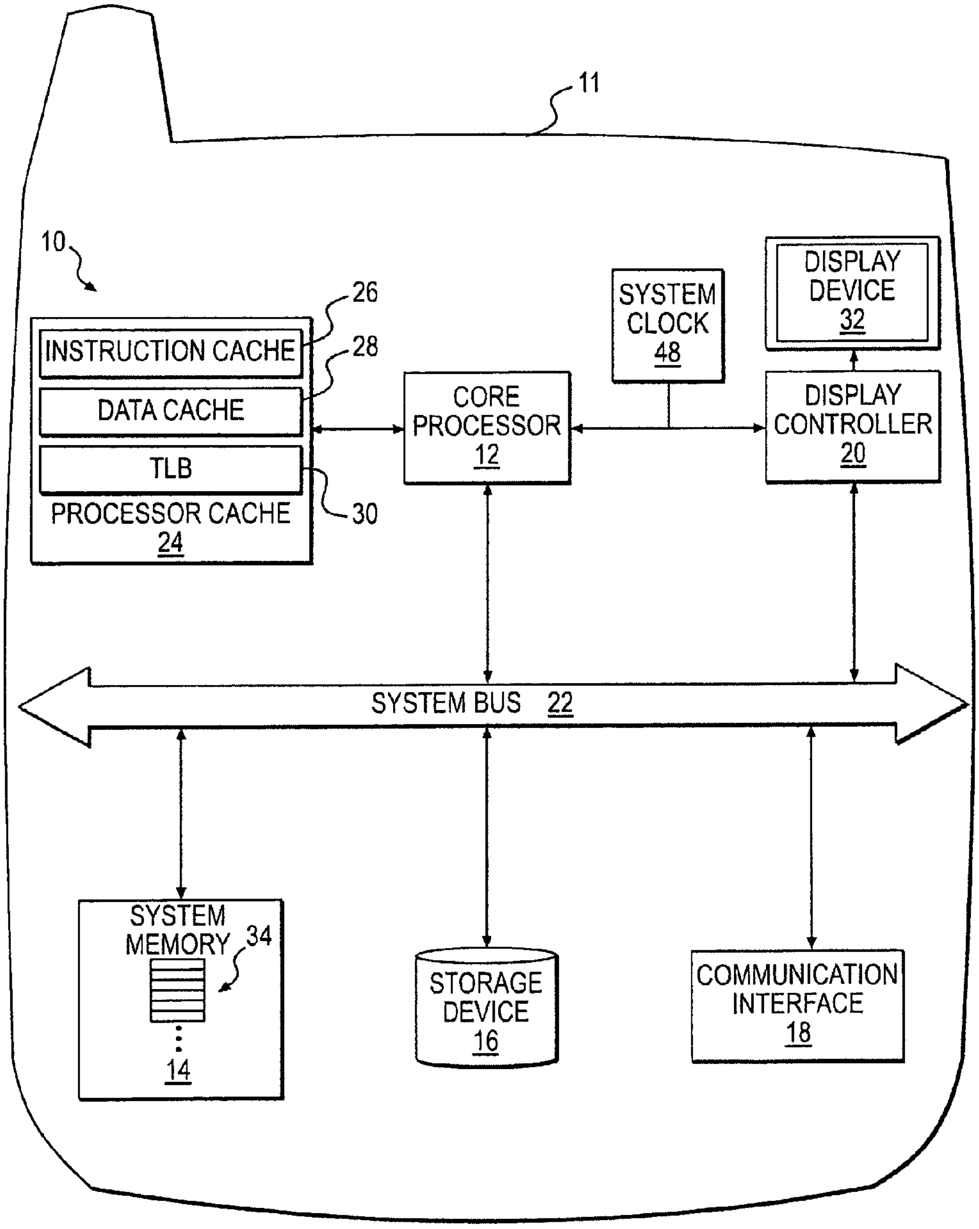
FIG. 1 is a representation of an exemplary disclosed display system.

FIG. 1 shows an exemplary display system 10 for processing display data. Display system 10 may be associated with a mobile device such as a cellular telephone, a personal digital assistant (PDA), pocket PC, a Blackberry®, a personal media player, and/or another mobile or hand-held device; a laptop computer; a desktop computer; a digital television, and/or another computing system 11 for processing display data. While it is to be appreciated that computing system 11 may be any device that processes display data, in one embodiment, computing system 11 may be a mobile device in which computing resources, such as available power and/or available throughput or bandwidth, are relatively scarce (e.g., as in a cellular telephone, a Blackberry, etc.).

As shown by FIG. 1, display system 10 may include, among other features, a core processor 12, a system memory 14, a storage device 16, a communication interface 18, and a display controller 20 in communication via a system bus 22.

Core processor 12 may include one or more processing devices configured to execute instructions and to process data to perform functions of display system 10. For example, core processor 12 may include one or more general or special purpose microprocessors (e.g., a CPU). Core processor 12 may include or otherwise be associated with processor cache 24 to/from which information may be written/read.

Processor cache 24 may include, among other things, an instruction cache 26, a data cache 28, and a translation lookaside buffer (TLB) 30. While instruction cache 26, data cache 28, and TLB 30 are shown in FIG. 1 as distinct caches, it is to be appreciated that they may be integrated into a single cache, if desired.

Instruction cache 26 may include random access memory (e.g., static RAM) that temporarily stores sequences of computer program instructions frequently and/or recently used by core processor 12. For example, upon initialization of display system 10, core processor 12 may read such computer program instructions from storage device 16 and write the instructions to instruction cache 26 for subsequent execution. Core processor 12 may then periodically fetch sequences of computer program instructions from instruction cache 26 and execute the instructions as needed. Functions associated with instruction cache 26 may include instruction loading, instruction prefetching, instruction pre-decoding, branch prediction, and/or other functions.

Data cache 28 may include random access memory (e.g., static RAM) that temporarily stores data frequently and/or recently used by core processor 12. For example, data cache 28 may store data loaded from system memory 14 and/or storage device 16, the results of calculations performed by core processor 12, and/or other data for use by core processor 12. Core processor 12 may then periodically access the data stored in data cache 28 as necessary.

TLB 30 may include random access memory (e.g., static RAM) that temporarily stores address translation information. Programs running on display system 10 may generate virtual memory addresses for instructions and/or data used and/or generated by core processor 12 and stored in instruction cache 26 and/or data cache 28. The virtual addresses generated for these instructions and/or data may be stored in designated address space on TLB 30.

TLB 30 may allow core processor 12 to convert the virtual addresses into corresponding physical addresses in system memory 14. For example, TLB 30 may include one or more tables containing entries that map virtual addresses for instructions stored in instruction cache 26 and/or data stored in data cache 28 to corresponding physical addresses in system memory 14. A search by core processor 12 of TLB 30 for a particular virtual address in cache may yield a corresponding physical address in system memory 14.

System memory 14 may include one or more devices for storing information associated with operations of display system 10. For example, system memory 14 may include static RAM (SRAM), dynamic RAM (DRAM), and/or other volatile memory; and/or nonvolatile memory such as flash memory. System memory 14 may also include read-only memory, such as erasable programmable read-only memory (EPROM), electrically erasable programmable read-only memory (EEPROM), a SIM card, and/or other suitable read-only memory.

System memory 14 may store, among other things, display data that may be accessed (i.e., fetched) by display controller 20 for display on a display device 32. Display device 32 may include, for example, a liquid crystal display (LCD), a plasma display, a cathode ray tube (CRT) display, or another suitable display. While it is to be appreciated that display device 32 may be any type of display, display device 32 may typically be an LCD when implemented in a mobile or handheld device, as an LCD generally consumes less power than its counterparts.

The display data may be stored in a first-in-first-out (FIFO) buffer 34. For example, the entries of FIFO 34 may contain pixel data to be displayed on one or more pixels of display device 32. The pixel data may be 4-bit, 8-bit, 16-bit, 32-bit, etc., depending on the amount of color depth, brightness levels, and/or other characteristics provided for by the display data. Display data may be stored in system memory 14 prior to display on display device 32. For example, core processor 12 may load the display data from storage device 16 or receive the display data from communication interface 18 (e.g., streaming video data or a download from the Internet or another network), decode the display data into pixel data (i.e., color and/or brightness components), and store the pixel data in system memory 14 for subsequent display.

Storage device 16 may include any type of mass storage device for storing information that core processor 12 may need to perform processes disclosed herein. For example, storage device 16 may include one or more magnetic and/or optical disk devices, such as a hard drive, a CD-ROM drive, a DVD-ROM drive, a Flash drive, and/or any other type of mass media storage device. Storage device 16 may contain compressed or uncompressed video data (e.g., MPEG video files, Real Media files, Quicktime video files, etc.). Core processor 12 may load the video data from storage device 16 and, if necessary, uncompress and/or decode the video data into pixel data, which may be stored in system memory 14 for subsequent display.

Communication interface 18 may include any device configured to enable display system 10 to communicate with other devices (e.g., servers, cell phones, and/or other communication devices) directly or thorough a network (e.g., the Internet, a cellular telephone network, a satellite-based network, a Bluetooth network, and/or any other suitable network). For example, communication interface 18 may include a wireless network adapter having an antenna, a transceiver, and/or or suitable network communication components. Communication interface 18 may receive from the network, among other things, video data (e.g., streaming video and/or a video download), which may be stored in system memory 14 and/or on storage device 16.

Figure 2:
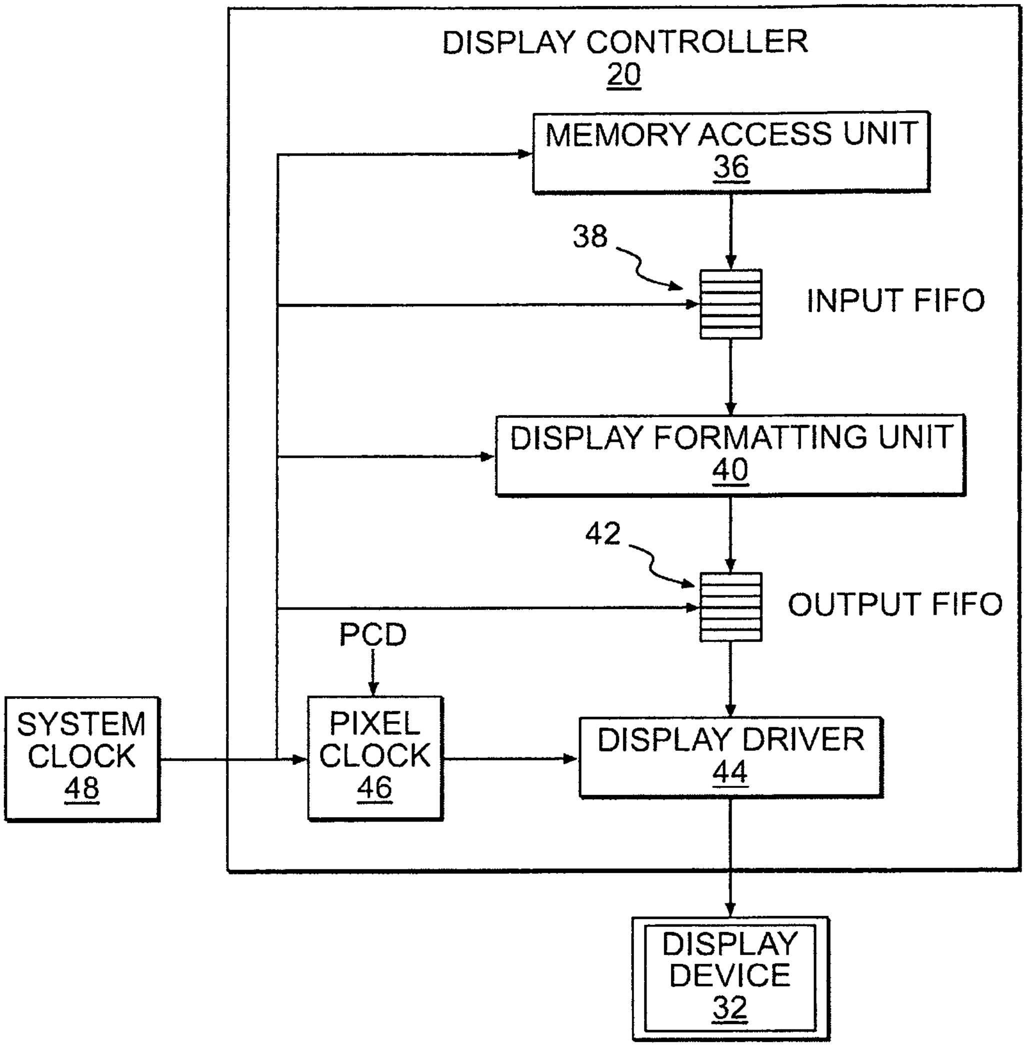
FIG. 2 is a representation of an exemplary disclosed display controller for use with the display system of FIG. 1.

Display controller 20 may be configured to control and/or to manage processes associated with fetching pixel data from system memory 14 and processing the pixel data for viewing on display device 32. Referring to FIG. 2, display controller 20 may include a memory access unit 36, an input FIFO buffer 38, a display formatting unit 40, an output FIFO 42, and a display driver 44 driven by a pixel clock 46.

Memory access unit 36 may be configured to fetch pixel data from system memory 14 (i.e., from FIFO 34) and to store the fetched pixel data in input FIFO 38. Input FIFO 38 may send a request to memory access unit 36 to fetch additional pixel data from system memory 14 when one or more entries in input FIFO 38 become available. Thus, memory access unit 36 may fetch pixel data from system memory 14 on a demand basis to attempt to keep input FIFO 38 full, provided that sufficient system bandwidth is available.

Display formatting unit 40 may be configured to read the pixel data stored in input FIFO 38 and to convert the pixel data into a form suitable for display on display device 32. For example, display formatting unit 40 may include or otherwise be associated with a color palette lookup table (not shown) that maps between various color depths. For example, if display system 10 is configured to display 16-bit color but the pixel data contained in system memory 14 and stored in input FIFO 38 is formatted for 8-bit color, display formatting unit 40 may use the color palette lookup table to convert the 8-bit color pixel data into a corresponding 16-bit color pixel data, and vice versa. Display formatting unit 40 may also include an elemental color lookup table (not shown) that maps the pixel data to corresponding values for red, green, blue, and/or brightness. For example, display formatting unit 40 may use the elemental color lookup table to convert 8- or 16-bit pixel data into corresponding values for red, green, blue, and brightness. Display formatting unit 40 may then write the formatted pixel data to output FIFO 42.

Display driver 44 may be configured to drive display device 32 in response to a signal received from a pixel clock 46. For example, for each pixel clock cycle (e.g., 60 times per second), display driver 44 may read a complete frame's worth of the formatted pixel data from output FIFO 42 and drive display device 32 based thereon. Specifically, display driver 44 may convert the formatted pixel data read from output FIFO 42 into corresponding analog signals to drive rows and/or columns of pixels on display device 32. Display driver 44 may apply these analog signals to corresponding terminals or pins (not shown) of display device 32 which, in turn, may cause the pixels of display device 32 to display the frame image. Output FIFO 42 may be configured to attempt to say full by sending a request to input FIFO 38 and/or memory access unit 36 for an amount of pixel data needed to fill the entries in output FIFO 42 read by display driver 44.

Typically, core processor 12 has a higher priority on system bus 22 than display controller 20. Thus, in situations where the throughput of system bus 22 is at its maximum, the activities and/or requests of core processor 12 may take precedence over the activities or requests of display controller 20. For example, in a situation where core processor 12 requests to read data from system memory 14 for writing to processor cache 24 while display controller 20 requests to fetch additional pixel data from system memory 14, and the throughput of system bus 22 is at its maximum, the core processor's reading/writing requests may be given priority over the display controller's fetching request.

Such situations may lead to the "under-run," or "starving" of display device 32. For example, if display controller 20 is unable to read pixel data from system memory 14 at the rate required to sustain the refresh rate commanded by pixel clock 46 (e.g., 60 Hz) over a sufficient period of time, output FIFO 42 may be exhausted. That is, display driver 44 may read and display all of the formatted pixel data contained in output FIFO 42, and there is insufficient formatted pixel data to display a complete frame at the next pixel clock cycle. As a result, blank and/or corrupt frames may be displayed between valid frames and detected by the human eye. This is phenomenon is known as "flicker."

One way to reduce or eliminate display under-run is to appropriately adjust or calibrate pixel clock 46. As shown by FIG. 1, pixel clock 46 may be driven by and, thus, derived from a system clock 48 (e.g., a crystal oscillator). For example, pixel clock 46 and system clock 48 may be interconnected by a phase locked loop. In order to produce a pixel clock cycle appropriate for the desired refresh rate of display device 32 (e.g., 60 Hz), pixel clock 46 may scale down or divide the frequency of system clock 48, as the frequency of system clock 48 is typically much greater than conventional display refresh rates. As such, pixel clock 46 may be a frequency divider component or the like configured to divide the frequency of system clock 48 based on an appropriate pixel clock divisor (PCD). The PCD is set to yield an appropriate refresh rate that will not cause display under-run.

Figure 3:
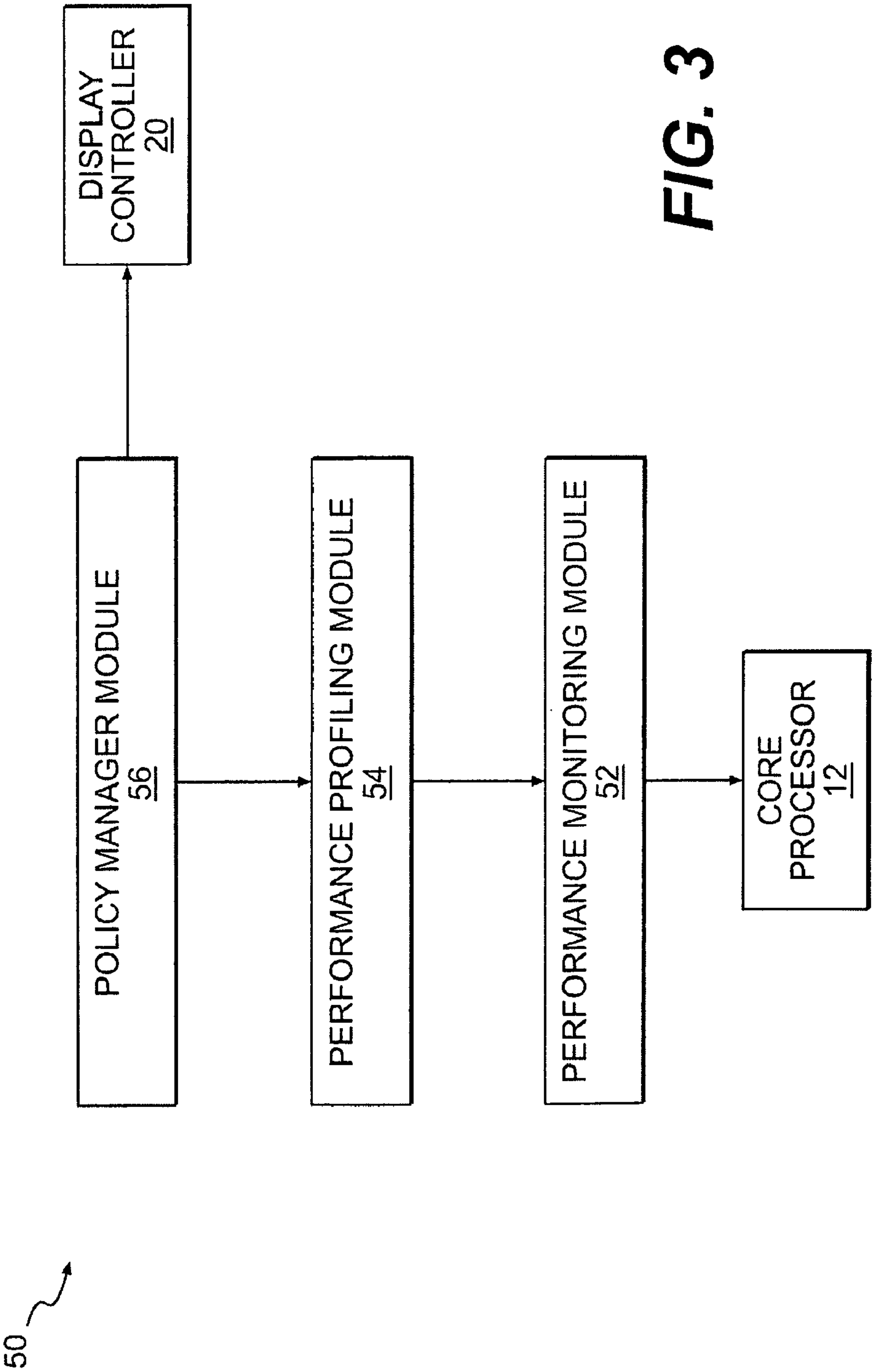
FIG. 3 is a representation of an exemplary disclosed performance monitoring application for use with the display system of FIG. 2.

FIG. 3 shows an exemplary disclosed performance monitoring application 50 that may be executed by display system 10 for, among other things, reducing or eliminating display under-run and/or optimizing power consumption. Application 50 may be, for example, a background software tool run by the operating system of display system 10 during the display operations discussed above. Alternatively or additionally, application 50 may be implemented by way of one or more discrete circuit components (e.g., an integrated circuit) associated with display system 10. Application 50 may include a performance monitoring module 52, a performance profiling module 54, and a policy manager module 56.

Performance monitoring module 52 may be configured to interface with core processor 12 and to monitor various events that occur on system bus 22 during operation of display system 10. For example, performance monitoring module 52 may include embedded performance monitoring counters associated with core processor 12 and configured to detect and count the occurrence of certain events for a number of system clock cycles.

The monitored (i.e., counted) events may include, for example, system clock cycles in which access to system memory 14 is granted to core processor 12 by system bus 22; system clock cycles in which display controller 20 requests access to system memory 14 (i.e., to fetch pixel data); failed attempts by core processor 12 to read or write information to or from instruction cache 26 (i.e., "instruction cache misses"); failed attempts by core processor 12 to locate in and/or read from TLB 30 virtual addresses for instructions contained in instruction cache 26 (i.e., "TLB cache misses"); failed attempts by core processor 12 to locate in and/or read from TLB 30 virtual addresses for data contained in data cache 28; system clock cycles in which access is granted to core processor 12 by system bus 22 for writing data to system memory 14; system clock cycles in which core processor 12 writes data stored in processor cache 24 (e.g., one or more of instruction cache 26, data cache 28, and/or TLB 30) to system memory 14; and/or other such events. It is to be appreciated, however, that performance monitoring module 52 may include additional performance monitoring counters configured to monitor other events that may occur on system bus 22 during operation of display system 10.

Performance profiling module 54 may be configured to calculate various system bandwidth/throughput metrics based on the monitored events discussed above. For example, performance profiling module 54 may calculate the core processor throughput available on system bus 22. Toward this end, performance profiling module 54 may calculate the number of read accesses to system memory 14 initiated by core processor 12 during the time the system events were monitored (i.e., during the number of clock cycles) according to the following equation:

$$N_{Core\,Reads}=N_{MemoryGrant}-N_{Dislpay\,Requests}-I_{Miss}-2\cdot(I_{LB\_Miss}+D_{TLB\_Miss}) \quad (1)$$

where:

- $N_{CoreReads}$ is the number read accesses to system memory 14 initiated by core processor 12;
- $N_{memoryGrant}$ is the number of system clock cycles in which access to system memory 14 is granted to core processor 12 by system bus 22;
- $N_{DisplayRequests}$ is the number of system clock cycles in which display controller 20 requests access system memory 14 (i.e., to fetch pixel data);
- $I_{Miss}$ is the number of failed attempts by core processor 12 to read or write information to or from instruction cache 26 (i.e., the number of instruction "cache misses");
- $I_{TLB\_Miss}$ is the number of failed attempts by core processor 12 to locate in and/or read from TLB 30 virtual addresses for instructions contained in instruction cache 26 (i.e., the number of "TLB instruction cache misses"); and
- $D_{TLB\_Miss}$ is the number of failed attempts by core processor 12 to locate in and/or read from TLB 30 virtual addresses for data contained in data cache 28 (i.e., the number of "TLB data cache misses").

Performance profiling module 54 may further calculate the number of write accesses to system memory 14 initiated by core processor 12 during the time the system events were monitored (i.e., during the number of clock cycles) according to the following equation:

$$N_{CoreWrites}=N_{CoreGrant}-N_{Core\,Reads}-D_{WriteBack}-2\cdot(I_{TLB\_Miss}+D_{TLB\_Miss}) \quad (2)$$

where:

- $N_{CoreWrites}$ is the number of write accesses to system memory 14 initiated by core processor 12;
- $N_{CoreGrant}$ is the number of system clock cycles in which access is granted to core processor 12 by system bus 22 for writing data to system memory 14;
- $N_{CoreReads}$ is the number of read accesses to system memory 14 initiated by core processor 12, as calculated per equation (1) above;
- $D_{WriteBack}$ is the number of system clock cycles in which core processor 12 writes data stored in processor cache 24 (e.g., one or more of instruction cache 26, data cache 28, and TLB 30) to system memory 14 (i.e., "cache write backs");
- $I_{TLB\_Miss}$ the number of failed attempts by core processor 12 to locate in and/or read from TLB 30 virtual addresses for instructions contained in instruction cache 26 (i.e., the number of "TLB instruction cache misses"); and
- $D_{TLB\_Miss}$ the number of failed attempts by core processor 12 to locate in and/or read from TLB 30 virtual addresses for data contained in data cache 28 (i.e., the number of "TLB data cache misses").

It is to be appreciated that $N_{Core\,Reads}$ and $N_{Core\,Writes}$, as calculated by performance profiling module 54 according to equations (1) and (2) above, respectively, may be indicative of the core processor throughput available on system bus 22. Specifically, because the number of requests by display controller 20 to access system memory 14 (to fetch pixel data), $N_{Display\,Requests}$, is subtracted from the number of times access to system memory 14 is granted to core processor 12 by system bus 22, $N_{memory\,Grant}$, $N_{Core\,Reads}$ and $N_{Core\,Writes}$ together may be indicative of the throughput on system bus 22 due to core processor 12, and not display controller 20. In other words, $N_{Core\,Reads}$ and $N_{Core\,Writes}$ may indicate the traffic on system bus 22 between core processor 12 and system memory 14, rather than the traffic between display controller 20 and system memory 14.

Performance profiling module 54 may further calculate the core processor throughput available on system bus 22 according to the following equation:

$$TP_{Core}=\frac{N_{CoreReads}\cdot R_B+N_{CoreWrites}\cdot W_B+D_{WriteBack}\cdot WB_B}{N_{Cycles}} \quad (3)$$

where:

- $TP_{Core}$ is the core processor throughput available on system bus 22 in Bps (or bps);
- $N_{CoreReads}$ is the number of read accesses to system memory 14 initiated by core processor 12, as calculated per equation (1) above;
- $R_B$ is a constant representing the amount of data (in bytes or bits) read from system memory 14 for each read access (e.g., 32 bytes);
- $N_{CoreWrites}$ is the number of write accesses to system memory 14 initiated by core processor 12, as calculated per equation (2) above;
- $W_B$ is a constant representing the amount of data (in bytes or bits) written to system memory 14 for each write access (e.g., 4 bytes);
- $D_{WriteBack}$ is the number of system clock cycles in which core processor 12 writes data stored in processor cache 24 (e.g., one or more of instruction cache 26, data cache 28, and TLB 30) to system memory 14 (i.e., "cache write backs");
- $WB_B$ is a constant representing the amount of data (in bytes or bits) written to system memory 14 for each cache write back (e.g., 16 bytes); and
- $N_{Cycles}$ is the number of system clock cycles for which the events were monitored.

It is to be appreciated that the values for $R_B$, $W_B$, and $WB_B$ may depend on the particular architecture and/or configuration of display system 10.

As discussed above, core processor 12 may have the highest priority on system bus 22. Thus, in situations where display controller 20 requires or requests more throughput than is presently available on system bus 22 (e.g., because of activities by core processor 12), the requirements of display controller 20 may not be met, leading to display under-run. That is, display controller 20 may request or require from system memory 14 pixel data at a rate greater than that which can be sustained by the throughput available on system bus 22. As a result, output FIFO 42 may be exhausted of one or more complete frame's worth of formatted pixel data and display driver 44 may drive display with insufficient pixel data, causing blank and/or corrupt frames to be shown on display device 32 between valid frames (i.e., "flicker"). For example, pixel clock 46 may be set for a refresh rate of 60 frames per second (i.e., a pixel clock cycle of 60 Hz), but the available throughput on system bus 22 may only be sufficient to sustain a maximum refresh rate of 50 frames per second. Thus, in order to ensure that display under-run does not occur, pixel clock 46 is set such that the throughput required by display device 32 and, thus, display controller 20 (which accesses system memory 14 to fetch pixel data) is always less than the core processor throughput available on system bus 22, $TP_{core}$.

Toward this end, policy manager module 56 may be configured to adjust the throughput requirements of display controller 20 based on the results of the above calculations in order to avoid display under-run. Specifically, policy manager module 56 may determine the maximum sustainable display refresh rate (i.e., the maximum sustainable pixel clock cycle frequency) given the available core processor throughput on system bus 22, $TP_{core}$, according to the following equation:

$$RR_{\text{Max}} = \frac{TP_{Core}}{R_{Display} \cdot P_B} \tag{4}$$

where:

- $RR_{Max}$ is the maximum sustainable display refresh rate (i.e., the maximum pixel clock frequency) without causing display under-run given the available core processor throughput,
- $TP_{Core}$ is the core processor throughput available on system bus 22 in Bps (or bps) calculated in equation (3) above,
- $R_{Display}$ a constant representing the resolution of display device 32 (i.e., the number of pixels on display device 32), and
- $P_B$ is a constant representing the amount of data (in bytes or bits) comprising each pixel on display device 32.

The values for $R_{Display}$ and $P_B$, may depend on the particular architecture and/or configuration of display system 10.

It is to be appreciated that the maximum sustainable display refresh rate, $RR_{Max}$, may correspond to a maximum throughput of display device 32. For example, a display having a resolution of 320×240 pixels displaying 16-bit pixel data at a refresh rate of 60 Hz will have required throughput of 320×240×16×60=74.4 Mbps, or 9.2 MBps. Thus, in this example, display controller 20 may require a throughput of 9.2 MBps on system bus 22 in order to sustain the refresh rate of 60 Hz. In other words, display controller 20 may need to access 9.2 MB of pixel data in system memory 14 each second to sustain the refresh rate. Depending on the core processor throughput available on system bus 22, $TP_{Core}$, this data rate may or may not be sustainable without incurring display under-run. By calculating the maximum sustainable display refresh rate, $RR_{Max}$, based on the given available core processor throughput, $TP_{Core}$, per equation (4) above, policy manager module 56 may identify the upper limit refresh rate that display system 10 can sustain without incurring display under-run.

Policy manager module 56 may then determine an appropriate pixel clock divisor (PCD) (see FIG. 2) based on the maximum sustainable refresh rate, $RR_{Max}$, calculated according to equation (4) above. As discussed above, pixel clock 46 may be derived from and/or driven by system clock 48, which may run at a much higher frequency than pixel clock 46. Thus, an appropriate PCD may be determined to scale down the frequency of system clock 48 to an appropriate refresh rate (e.g., less than or equal to $RR_{Max}$ determined in equation (4) above). For example, policy manager module 56 may determine the PCD according to the following equation:

$$PCD = \frac{CLK_{System}}{2 \cdot CLK_{Pixel}} - 1 \tag{5}$$

where:

- PCD is the pixel clock divisor;
- $CLK_{System}$ is the frequency of system clock 48; and
- $CLK_{Pixel}$ is the frequency of pixel clock 46, which must be less than or equal to the maximum sustainable refresh rate, $RR_{Max}$, as discussed above.

It is to be appreciated, however, that equation (5) may depend on the particular architecture and/or configuration of display system 10, the relationship between system clock 48 and pixel clock 46, and/or other factors.

Policy manager module 56 may further be configured to interface with display controller 20 to set pixel clock 46 based on the calculated PCD. For example, policy manager module 56 may generate a signal indicative of the PCD and send the signal to pixel clock 46. Pixel clock 46 may then divide the frequency of system clock 48 based on the PCD, resulting in a pixel clock signal having a frequency less than the maximum sustainable refresh rate, $RR_{Max}$. Accordingly, display device 32 (and display controller 20) may have a required throughput less than the available throughput on system bus 22, and display under-run may be reduced or eliminated.

Alternatively or additionally, the calculations and determinations performed by application 50 discussed above may be carried out based on a computer simulation of display system 10, such as, for example, a Register Transfer Level (RTL) simulation, a SPICE® simulation, a Xilinx® simulation, and/or another computer-based simulation of display system 10. In another embodiment, the calculations and determinations performed by application 50 discussed above may be implemented in a computer laboratory test-bed or the like.

In this manner, a maximum sustainable display refresh rate for display system 10 may be determined before display system 10 is actually implemented in hardware (i.e., pre-silicon). That is, the methods and calculations discussed above may be implemented as a validation for a system design before display system 10 is approved for production (i.e., produced in large quantities), or even built. If, during this validation, it is determined that the maximum sustainable refresh rate of a particular design is insufficient for certain purposes, such as customer demands or expectations, designers may take appropriate measures to modify the system design to increase the available throughput on system bus 22. Alternatively, if increasing the available throughput is not an option (e.g., due to cost considerations), the designers may choose to set the refresh rate to the maximum sustainable value according to the calculations above before implementing display system 10 in hardware.

The disclosed systems and methods may be applicable to any display system. Specifically, the disclosed systems and methods may be useful in any display system in which power and performance are optimized and computing resources, such as available bandwidth or throughput and/or power consumption, are scarce. By monitoring events that occur on the system bus, determining the available core processor throughput on the system bus, and setting the pixel clock frequency such that the required throughput of the display is less than the available core processor throughput on the system bus, display under-run can be reduced or eliminated. Further, power consumption may be reduced. For example, low-power processors can be used and run at a lower frequency, as the bus throughput may be allocated efficiently (pre-silicon or during operation of the display system). In addition, power may also be conserved because the display may be run at a lower refresh rate to avoid under-run.

Those skilled in the art will appreciate that all or part of systems and methods consistent with the present disclosure may be stored on or read from other computer-readable storage media. Display system 10 may include a computer-readable storage medium having stored thereon computer-executable instructions which, when executed by a computer, cause the computer to perform, among other things, the methods disclosed herein. Exemplary computer readable storage media may include secondary storage devices, like hard disks, floppy disks, CD-ROM, or other forms of computer-readable storage media. Such computer-readable storage media may be embodied by one or more components of display system 10, such as core processor 12, system memory 14, storage device 16, display controller 20, processor cache 24, and/or combinations of these and other components.

Furthermore, one skilled in the art will also realize that the processes illustrated in this description may be implemented in a variety of ways and include multiple other modules, programs, applications, scripts, processes, threads, or code sections that may all functionally interrelate with each other to accomplish the individual tasks described above for each module, script, and daemon. For example, it is contemplated that these programs modules may be implemented using commercially available software tools, using custom object-oriented code written in the C++ programming language, using applets written in the Java programming language, or may be implemented as with discrete electrical components or as one or more hardwired application specific integrated circuits (ASIC) custom designed for this purpose.

The described implementation may include a particular network configuration, but embodiments of the present disclosure may be implemented in a variety of data communication network environments using software, hardware, or a combination of hardware and software to provide the processing functions.

It will be apparent to those skilled in the art that various modifications and variations can be made to the disclose system and method for reducing display under-run and conserving power. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A method for reducing display under-run, the method comprising:

operating a display system comprising a processor, a memory, and a display controller on a bus;

monitoring, during the operation of the display system, events that occur on the bus;

calculating, based on the monitored events, an available throughput of the processor on the bus; and determining a refresh rate of the display controller such that a throughput on the bus required by the display controller is less than the calculated available throughput; and dynamically adjusting a current refresh rate of the display controller to the determined refresh rate during the operation of the display system to reconfigure the display controller to use less than the available throughput.

2. The method of claim 1, further comprising:

calculating a pixel clock divisor based on the determined refresh rate; and setting a frequency of a pixel clock based on the pixel clock divisor, the pixel clock being configured to drive the display controller.

3. The method of claim 1, wherein the available throughput is calculated according to $$TP_{Core} = \frac{N_{CoreReads} \cdot R_B + N_{CoreWrites} \cdot W_B + D_{WriteBack} \cdot WB_B}{N_{Cycles}}$$

where:

$TP_{core}$ is the processor throughput available on the bus, $N_{CoreReads}$ is a monitored number of read accesses to the memory initiated by the processor, $R_B$ is an amount of data read from the memory for each of the monitored read accesses, $N_{CoreWrites}$ is a monitored number of write accesses to the memory initiated by the processor, $W_B$ is an amount of data written to the memory for each of the monitored write accesses, $D_{WriteBack}$ is a monitored number of clock cycles in which the processor writes information stored in cache to the memory, $WB_B$ is an amount of data written to the memory for each of the monitored writes of information stored in cache to the memory, and $N_{cycles}$ is a number of clock cycles that pass during the monitoring.

4. The method of claim 3, wherein:

the monitored number of read accesses to the memory initiated by the processor is calculated according to $$N_{Core\ Reads} = N_{MemoryGrant} - N_{Display\ Requests} - I_{Miss} \cdot 2 \cdot (I_{TLB\_Miss} + D_{TLB\_Miss}),$$

where:

$N_{CoreReads}$ is the monitored number of read accesses to the memory initiated by the processor, $N_{MemoryGrant}$ is a monitored number of clock cycles in which access to the memory is granted to the processor, $N_{DisplayRequests}$ is a monitored number of clock cycles in which the display controller requests access to the memory, $I_{Miss}$ is a monitored number of failed attempts by the processor to read or write information to or from instruction cache, $I_{TLB\_Miss}$ is a monitored number of failed attempts by the processor to locate in a translation lookaside buffer virtual addresses for instructions contained in the instruction cache, and $D_{TLB\_Miss}$ is a monitored number of failed attempts by the processor to locate in the translation lookaside buffer virtual addresses for data contained in data cache; and the monitored number of write accesses to the memory initiated by the processor is calculated according to $$N_{Core\ Writes} = N_{CoreGrant} - N_{Core\ Reads} - D_{WriteBack} - 2 \cdot (I_{TLB_{Miss}} + D_{TLB_{Miss}}),$$

where:

$N_{CoreWrites}$ is the monitored number of write accesses to the memory initiated by the processor, $N_{CoreGrant}$ is a monitored number of clock cycles in which access is granted to the core processor for writing data to the memory, $N_{CoreReads}$ is the monitored number of read accesses to the memory initiated by the processor, $D_{WriteBack}$ is the monitored number of clock cycles in which the processor writes information stored in cache to the memory, $I_{TLB\_Miss}$ is a monitored number of failed attempts by the processor to locate in a translation lookaside buffer virtual addresses for instructions contained in instruction cache, and $D_{TLB\_Miss}$ is a monitored number of failed attempts by the processor to locate in the translation lookaside buffer virtual addresses for data contained in data cache.

5. A display system, comprising:

a processor;

a memory;

a display device;

a display controller configured to control the display device;

a bus connecting the processor, the memory, and the display controller;

a performance monitoring module configured to monitor events that occur on the bus during operation of the display system;

a performance profiling module configured to calculate, based on the monitored events, an available throughput of the bus; and a policy manager module configured to determine a new refresh rate for the display controller that uses a throughput on the bus that is less than the calculated available throughput and to dynamically adjust a current refresh rate of the display controller to the new refresh rate during the operation of the display device to reconfigure the display controller to use less than the available throughput.

6. The display system of claim 5, wherein:

the performance monitoring module is further configured to count accesses to the memory by the processor and to count accesses to the memory by the display controller; and the performance profiling module is further configured to subtract the accesses to the memory by the display controller from the accesses to the memory by the processor.

7. The display system of claim 5, further comprising a pixel clock configured to drive the display device via the display controller, wherein the policy manager module is further configured to:

calculate a pixel clock divisor based on the determined new refresh rate; and determine a frequency of the pixel clock based on the pixel clock divisor.

8. The display system of claim 5, wherein the performance profiling module is further configured to calculate the available throughput according to $$TP_{Core} = \frac{N_{CoreReads} \cdot R_B + N_{CoreWrites} \cdot W_B + D_{WriteBack} \cdot WB_B}{N_{Cycles}}$$

where:

$TP_{core}$ is the processor throughput available on the bus, $N_{CoreReads}$ is a monitored number of read accesses to the memory initiated by the processor, $R_B$ is an amount of data read from the memory for each of the monitored read accesses, $N_{CoreWrites}$ is a monitored number of write accesses to the memory initiated by the processor, $W_B$ is an amount of data written to the memory for each of the monitored write accesses, $D_{WriteBack}$ is a monitored number of clock cycles in which the processor writes information stored in cache to the memory, $WB_B$ is an amount of data written to the memory for each of the monitored writes of information stored in cache to the memory, and $N_{Cycles}$ is a number of clock cycles that pass during the monitoring.

9. The display system of claim 8, wherein:

the performance profiling module is further configured to calculate the monitored number of read accesses to the memory initiated by the processor according to $$N_{Core\ Reads} = N_{MemoryGrant} - N_{Display\ Requests} - I_{Miss} - 2 \cdot (I_{TLB\_Miss} + D_{TLB\_Miss}),$$

where:

$N_{CoreReads}$ is the monitored number of read accesses to the memory initiated by the processor, $N_{MemoryGrant}$ is a monitored number of clock cycles in which access to the memory is granted to the processor, $N_{DisplayRequests}$ is a monitored number of clock cycles in which the display controller requests access to the memory, $I_{Miss}$ is a monitored number of failed attempts by the processor to read or write information to or from instruction cache, $I_{TLB\_Miss}$ is a monitored number of failed attempts by the processor to locate in a translation lookaside buffer virtual addresses for instructions contained in the instruction cache, and $D_{TLB\ MISS}$ is a monitored number of failed attempts by the processor to locate in the translation lookaside buffer virtual addresses for data contained in data cache; and the performance profiling module is further configured to calculate the monitored number of write accesses to the memory initiated by the processor according to $$N_{CoreWrites} = N_{CoreGrant} - N_{Core\ Reads} - D_{WriteBack} - 2 \cdot (I_{TLB_{Miss}} + D_{TLB_{Miss}}),$$

where:

$N_{CoreWrites}$ is the monitored number of write accesses to the memory initiated by the processor, $N_{CoreGrant}$ is a monitored number of clock cycles in which access is granted to the core processor for writing data to the memory, $N_{CoreReads}$ is the monitored number of read accesses to the memory initiated by the processor, $D_{WriteBack}$ is the monitored number of clock cycles in which the processor writes information stored in cache to the memory, $I_{TLB\_Miss}$ is a monitored number of failed attempts by the processor to locate in a translation lookaside buffer virtual addresses for instructions contained in instruction cache, and $D_{TLB\_Miss}$ is a monitored number of failed attempts by the processor to locate in the translation lookaside buffer virtual addresses for data contained in data cache.

10. The display system of claim 5, wherein the display system is included in a mobile device and the display device includes a liquid crystal display (LCD).

11. A system for reducing display under-run in a display device comprising a processor, a memory, and a display controller on a bus, the system comprising:

a performance monitoring module configured to monitor events that occur on the bus during operation of the display system;

a performance profiling module configured to calculate, based on the monitored events, an available throughput of the bus; and a policy manager module configured to determine a refresh rate for the display controller that uses a throughput on the bus that is less than the calculated available throughput and to dynamically adjust a current refresh rate of the display controller to the determined refresh rate during the operation of the display system to reconfigure the display controller to use less than the available throughput.

12. The system of claim 11, wherein:

the performance monitoring module is further configured to count accesses to the memory by the processor and count accesses to the memory by the display controller; and the performance profiling module is further configured to subtract the accesses by the display controller from the accesses to the memory by the processor.

13. The system of claim 11, wherein the policy manager module is further configured to:

calculate a pixel clock divisor based on the determined refresh rate; and set a frequency of a pixel clock based on the pixel clock divisor, the pixel clock being configured to drive the display controller.

14. The system of claim 11, wherein the performance profiling module is further configured to calculate the available throughput according to $$TP_{Core} = \frac{N_{CoreReads} \cdot R_B + N_{CoreWrites} \cdot W_B + D_{WriteBack} \cdot WB_B}{N_{Cycles}}$$

where:

$TP_{core}$ is the processor throughput available on the bus, $N_{CoreReads}$ is a monitored number of read accesses to the memory initiated by the processor, $R_B$ is an amount of data read from the memory for each of the monitored read accesses, $N_{CoreWrites}$ is a monitored number of write accesses to the memory initiated by the processor, $W_B$ is an amount of data written to the memory for each of the monitored write accesses, $D_{WriteBack}$ is a monitored number of clock cycles in which the processor writes information stored in cache to the memory, $WB_B$ is an amount of data written to the memory for each of the monitored writes of information stored in cache to the memory, and $N_{Cycles}$ is a number of clock cycles that pass during the monitoring.

15. The system of claim 14, wherein:

the performance profiling module is further configured to calculate the monitored number of read accesses to the memory initiated by the processor according to $$N_{Core\ Reads}=N_{MemoryGrant}-N_{Display\ Requests}-I_{Miss}2\cdot(I_{TLB\_Miss}+D_{TLB\_Miss}),$$

where:

$N_{CoreReads}$ is the monitored number of read accesses to the memory initiated by the processor, $N_{MemoryGrant}$ is a monitored number of clock cycles in which access to the memory is granted to the processor, $N_{DisplayRequests}$ is a monitored number of clock cycles in which the display controller requests access to the memory, $I_{Miss}$ is a monitored number of failed attempts by the processor to read or write information to or from instruction cache, $I_{TLB\_Miss}$ is a monitored number of failed attempts by the processor to locate in a translation lookaside buffer virtual addresses for instructions contained in the instruction cache, and $D_{TLB\_MISS}$ is a monitored number of failed attempts by the processor to locate in the translation lookaside buffer virtual addresses for data contained in data cache; and the performance profiling module is further configured to calculate the monitored number of write accesses to the memory initiated by the processor according to $$N_{Core\ Writes}=N_{CoreGrant}-N_{Core\ Reads}-D_{WriteBack}-2\cdot(I_{TLB_{Miss}}+D_{TLB\_Miss}),$$

where:

$N_{Core\ Writes}$ is the monitored number of write accesses to the memory initiated by the processor, $N_{CoreGrant}$ is a monitored number of clock cycles in which access is granted to the core processor for writing data to the memory, $N_{CoreReads}$ is the monitored number of read accesses to the memory initiated by the processor, $D_{WriteBack}$ is the monitored number of clock cycles in which the processor writes information stored in cache to the memory, $I_{TLB\_Miss}$ is a monitored number of failed attempts by the processor to locate in a translation lookaside buffer virtual addresses for instructions contained in instruction cache, and $D_{TLB\_Miss}$ is a monitored number of failed attempts by the processor to locate in the translation lookaside buffer virtual addresses for data contained in data cache.

16. A method for a display system, the method comprising:

simulating operation of the display system, the display system comprising a processor, a memory, and a display controller on a bus;

monitoring events that occur on the bus during the simulated operation;

calculating, based on the monitored events, an available throughput of the processor on the bus; and determining a refresh rate for the display controller such that a throughput on the bus required by the display controller is less than the calculated available throughput; and dynamically adjusting a current refresh rate of the display controller to the determined refresh rate during the operation of the display system to reconfigure the display controller to use less than the calculated available throughput.

17. The method of claim 16, further comprising implementing the display system in hardware with the determined refresh rate.

18. The method of claim 16, wherein:

the monitoring includes counting accesses to the memory by the processor and counting accesses to the memory by the display controller; and the calculating includes subtracting the accesses by the display controller from the accesses to the memory by the processor.

19. The method of claim 16, further comprising:

calculating a pixel clock divisor based on the determined refresh rate; and determining, based on the pixel clock divisor, a frequency of a pixel clock for driving the display controller.

20. The method of claim 16, wherein the available throughput is calculated according to $$TP_{Core} = \frac{N_{CoreReads} \cdot R_B + N_{CoreWrites} \cdot W_B + D_{WriteBack} \cdot WB_B}{N_{Cycles}}$$

where:

$TP_{Core}$ is the processor throughput available on the bus, $N_{CoreReads}$ is a monitored number of read accesses to the memory initiated by the processor, $R_B$ is an amount of data read from the memory for each of the monitored read accesses, $N_{CoreWrites}$ is a monitored number of write accesses to the memory initiated by the processor, $W_B$ is an amount of data written to the memory for each of the monitored write accesses, $D_{WriteBack}$ is a monitored number of clock cycles in which the processor writes information stored in cache to the memory, $WB_B$ is an amount of data written to the memory for each of the monitored writes of information stored in cache to the memory, and $N_{Cycles}$ is a number of clock cycles that pass during the monitoring.

21. The method of claim 20, wherein:

the monitored number of read accesses to the memory initiated by the processor is calculated according to $N_{Core\ Reads}=N_{MemoryGrant}-N_{Dislpay\ Requests}-I_{Miss}-2\cdot(I_{LB\_Miss}+D_{TLB\_Miss})$, where:

$N_{CoreReads}$ is the monitored number of read accesses to the memory initiated by the processor, $N_{MemoryGrant}$ is a monitored number of clock cycles in which access to the memory is granted to the processor, $N_{DisplayRequests}$ is a monitored number of clock cycles in which the display controller requests access to the memory, $I_{Miss}$ is a monitored number of failed attempts by the processor to read or write information to or from instruction cache, $I_{TLB\_Miss}$ is a monitored number of failed attempts by the processor to locate in a translation lookaside buffer virtual addresses for instructions contained in the instruction cache, and $D_{TLB\_Miss}$ is a monitored number of failed attempts by the processor to locate in the translation lookaside buffer virtual addresses for data contained in data cache; and the monitored number of write accesses to the memory initiated by the processor according to $$N_{CoreWrites}=N_{CoreGrant}-N_{Core\ Reads}-D_{WriteBack}-2\cdot(I_{TLB_{Miss}}+D_{TLB_{Miss}}),$$

where:

$N_{CoreWrites}$ is the monitored number of write accesses to the memory initiated by the processor, $N_{CoreGrant}$ is a monitored number of clock cycles in which access is granted to the core processor for writing data to the memory, $N_{CoreReads}$ is the monitored number of read accesses to the memory initiated by the processor, $D_{WriteBack}$ is the monitored number of clock cycles in which the processor writes information stored in cache to the memory, $I_{TLB\_Miss}$ is a monitored number of failed attempts by the processor to locate in a translation lookaside buffer virtual addresses for instructions contained in instruction cache, and $D_{TLB\_Miss}$ is a monitored number of failed attempts by the processor to locate in the translation lookaside buffer virtual addresses for data contained in data cache.

* * * * *